US012792099B2

(12) United States Patent
Lee et al.

(10) Patent No.: US 12,792,099 B2
(45) Date of Patent: Nov. 10, 2026

(54) DISPLAY DEVICE

(71) Applicant: Samsung Display Co., LTD., Yongin-si (KR)

(72) Inventors: Cheon Myeong Lee, Yongin-si (KR); Sang Ho Kim, Yongin-si (KR); Soo Min Baek, Yongin-si (KR); Ju Youn Son, Yongin-si (KR); Ji Won Lee, Yongin-si (KR); Baek Hyeon Lim, Yongin-si (KR); Ju Hwa Ha, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 396 days.

(21) Appl. No.: 18/513,809

(22) Filed: Nov. 20, 2023

(65) Prior Publication Data

US 2024/0272680 A1 Aug. 15, 2024

(30) Foreign Application Priority Data

Feb. 14, 2023 (KR) ........................ 10-2023-0019688

(51) Int. Cl.
*G06F 1/16* (2006.01)
*G06F 1/20* (2006.01)

(52) U.S. Cl.
CPC .......... *G06F 1/1656* (2013.01); *G06F 1/1643* (2013.01); *G06F 1/1647* (2013.01); *G06F 1/1652* (2013.01); *G06F 1/203* (2013.01)

(58) Field of Classification Search
CPC .... G06F 1/1656; G06F 1/1643; G06F 1/1647; G06F 1/1652; G06F 1/203; G06F 1/1601; G06F 9/30; H05K 5/0217
See application file for complete search history.

(56) References Cited

U.S. PATENT DOCUMENTS

| | | | | |
|---|---|---|---|---|
| 6,597,113 | B1 * | 7/2003 | Nitta | H05K 7/20963 345/205 |
| 10,347,700 | B2 | 7/2019 | Yang et al. | |
| 11,500,603 | B2 | 11/2022 | Shim et al. | |
| 2014/0198465 | A1 * | 7/2014 | Park | G09F 9/00 361/749 |
| 2018/0220537 | A1 * | 8/2018 | Heo | F16M 11/045 |

(Continued)

FOREIGN PATENT DOCUMENTS

| | | | |
|---|---|---|---|
| KR | 1020220020452 | A | 2/2022 |
| KR | 102414596 | B1 | 6/2022 |
| KR | 102488256 | B1 | 1/2023 |

*Primary Examiner* — Abhishek M Rathod
(74) *Attorney, Agent, or Firm* — CANTOR COLBURN LLP

(57) ABSTRACT

An auxiliary display device, which is connected to first and second display devices, includes: a display panel; upper and lower holders respectively connected to upper and lower portions of the display panel; an upper fixing portion connected to the upper holder to fix an upper end of the auxiliary display device to upper ends of the first and second display devices; and a lower fixing portion connected to the lower holder to fix a lower end of the auxiliary display device to lower ends of the first and second display devices, where when the first and second display devices are connected to each other by the upper fixing portion and the lower fixing portion, the display panel covers adjacent bezel areas of the first and second display devices.

15 Claims, 14 Drawing Sheets

(56) References Cited

U.S. PATENT DOCUMENTS

| | | | | |
|---|---|---|---|---|
| 2019/0081270 | A1* | 3/2019 | Kim | H10D 86/40 |
| 2022/0050653 | A1* | 2/2022 | Shim | G06F 3/1446 |
| 2022/0238821 | A1* | 7/2022 | Cho | G06F 3/0443 |

* cited by examiner

DISPLAY DEVICE

This application claims priority to Korean Patent Application No. 10-2023-0019688, filed on Feb. 14, 2023, and all the benefits accruing therefrom under 35 U.S.C. § 119, the content of which in its entirety is herein incorporated by reference.

BACKGROUND

(a) Field

The disclosure relates to a display device, and more particularly, to a display device in which a phenomenon in which screens are discontinuously viewed in boundary areas of respective display devices by bezels of the display devices in a multi-display device environment is improved.

(b) Description of the Related Art

As information technology has developed, importance of a display device, which is a connection medium between a user and information, has been highlighted. Accordingly, the use of display devices such as a liquid crystal display device, an organic light emitting display device, and the like are widely used in various fields.

Recently, due to various factors such as an increase in information processing amount per person and an increase in the number of game users, cases of displaying information using two or more display devices (for example, computer monitors) are substantially increasing.

In a case of simultaneously outputting one piece of information by using two or more display devices, due to a bezel area outside a display panel, an output screen may create a sense of discontinuity and disconnection in a boundary area between the display devices.

SUMMARY

According to embodiments of the present disclosure, in a multi-display device environment, a phenomenon in which a screen is discontinuously viewed at a boundary area between display devices due to a bezel of each display device may be improved.

An embodiment provides an auxiliary display device, which is connected to first and second display devices, including: a display panel; an upper holder and a lower holder respectively connected to upper and lower portions of the display panel; an upper fixing portion connected to the upper holder, where the upper fixing portion fixes an upper end of the auxiliary display device to an upper end of the first display device and an upper end of the second display device in a state where one edge of the first display device and one edge of the second display device are adjacent to each other; and a lower fixing portion connected to the lower holder, where the lower fixing portion fixes a lower end of the auxiliary display device to a lower end of the first display device and a lower end of the second display device in the state where the one edge of the first display device and the one edge of the second display device are adjacent to each other, where when the first and second display devices are connected to each other by the upper fixing portion and the lower fixing portion, the display panel covers a bezel area of the first display device corresponding to the one edge thereof and a bezel area of the second display device corresponding to the one edge thereof.

In an embodiment, the upper fixing portion may include: a first support member extending from a rear surface of the upper holder in a first direction perpendicular to the rear surface of the upper holder; a first rotation shaft extending from a lower surface of the first support member in a second direction perpendicular to the first direction; a first arm with one end connected to the first rotation shaft, where the first arm rotates about the first rotation shaft; and a second arm with one end connected to the first rotation shaft, where the second arm rotates about the first rotation shaft in an opposite direction to the first arm, the first arm and the second arm may be connected to the first rotation shaft through a first elasticity member, and the first elastic member may provide an elastic force to an opposing end of the first arm and an opposing end of the second arm in a direction opposite to the first direction.

In an embodiment, a distance between the first rotation shaft and the upper holder may be greater than a thickness of the first display device and a thickness of the second display device.

In an embodiment, the lower fixing portion may include: a second support member extending from a rear surface of the lower holder in the first direction perpendicular to the rear surface of the lower holder; a second rotation shaft extending from an upper surface of the second support member in a third direction which is opposite to the second direction; a third arm with one end connected to the second rotation shaft, where the third arm rotates about the second rotation shaft; and a fourth arm with one end connected to the second rotation shaft, where the fourth arm rotates about the second rotation shaft, the third arm and the fourth arm may be connected to the second rotation shaft through a second elastic member, and the second elastic member may provide an elastic force to an opposing end of the third arm and an opposing end of the fourth arm in a direction opposite to the first direction.

In an embodiment, a distance between the second rotation shaft and the lower holder may be greater than a thickness of the first display device and a thickness of the second display device.

In an embodiment, each of the first arm, the second arm, the third arm, and the fourth arm may include a rubber pad protruding from the opposing end thereof in the opposite direction to the first direction.

In an embodiment, the auxiliary display device may further include a driver including a driving circuit connected to the display panel, where the driving circuit provides a driving signal to the display panel, and a power supply portion which supplies power to the display panel.

In an embodiment, the auxiliary display device may further include a touch sensor disposed on a front surface of the display panel, wherein the driver may further include a touch driving circuit which is connected to the touch sensor and senses a touch input from an outside through the touch sensor.

In an embodiment, a width of a bezel of the auxiliary display device may be narrower than a width of a bezel of each of the first display device and the second display device.

In an embodiment, the upper holder may further include a groove defined in a lower portion thereof and a first clamp disposed on an inner surface of the upper holder, the first clamp may be connected to an upper end portion of the display panel inserted into the upper holder through the groove of the upper holder to fix the upper end portion of the display panel to the upper holder, the lower holder may further include a groove defined in an upper portion thereof and a second clamp disposed on an inner surface of the lower holder, and the second clamp may be connected to a lower end portion of the display panel inserted into the lower holder through the groove of the lower holder to fix the lower end portion of the display panel to the lower holder.

In an embodiment, the display panel may be a flexible display panel, and the display panel may be coupled to the upper holder and the lower holder in a bent shape.

In an embodiment, The first clamp and the second clamp may include a flexible material, and the first clamp and the second clamp may be bent in a same shape as the display panel.

In an embodiment, the upper holder may further include a first connection member with one end connected to the first clamp and an opposing end connected to the upper end portion of the display panel, the lower holder may further include a second connection member with one end connected to the second clamp and an opposing end connected to the lower end portion of the display panel, and the first connection member and the second connection member may include an elastic material or a stretchable material.

In an embodiment, the auxiliary display device may further include a front protective glass disposed on a front surface of the display panel and a rear protective glass disposed on a rear surface of the display panel.

In an embodiment, the auxiliary display device may further include a heat dissipating plate disposed on a rear surface of the rear protective glass.

According to embodiments of the disclosure, an auxiliary display device having a narrow bezel is disposed in a boundary area between a plurality of displays in a multi-display device environment, thereby improving a phenomenon that an output screen is discontinuously viewed in the boundary area between the displays.

DETAILED DESCRIPTION

Figure 1:
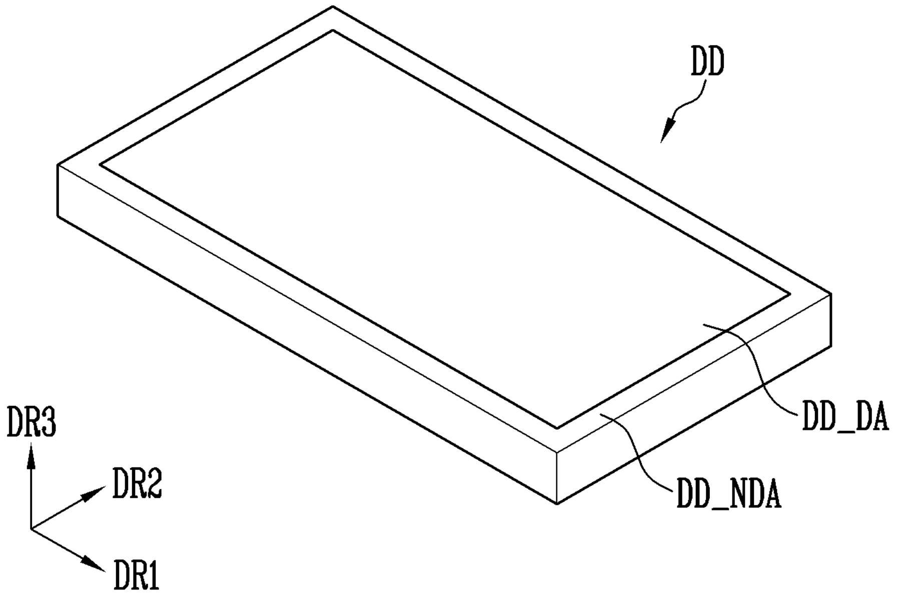
FIG. 1 illustrates a schematic perspective view of a display device according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

Like reference numerals are used for like constituent elements in describing each drawing. In the accompanying drawings, the dimensions of the structure are exaggerated and shown for clarity of the present disclosure.

Terms such as first, second, and the like will be used only to describe various constituent elements, and are not to be interpreted as limiting these constituent elements. The terms are only used to differentiate one constituent element from other constituent elements. For example, a first constituent element could be termed a second constituent element, and similarly, a second constituent element could be termed as a first constituent element, without departing from the scope of the present disclosure.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items.

In the present application, it should be understood that the term "include", "comprise", "have", or "configure" indicates that a feature, a number, a step, an operation, a constituent element, a part, or a combination thereof described in the specification is present, but does not exclude a possibility of presence or addition of one or more other features, numbers, steps, operations, constituent elements, parts, or combinations, in advance.

It will be understood that when an element is referred to as being "on" another element, it can be directly on the other element or intervening elements may be present therebetween. In contrast, when an element is referred to as being "directly on" another element, there are no intervening elements present.

It is to be understood that, in the present application, when it is described for one constituent element (for example, a first constituent element) to be (functionally or communicatively) "coupled or connected with/to" another constituent element (for example, a second constituent element), the one constituent element may be directly coupled or connected with/to the another constituent element, or may be coupled or connected with/to through the other constituent element (for example, a third constituent element). In contrast, it is to be understood that when it is described for one constituent element (for example, a first constituent element) to be "directly coupled or connected with/to" another constituent element (for example, a second constituent element), there is no other constituent element (for example, a third constituent element) between the one constituent element and the another constituent element.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the disclosure will be described in detail with reference to accompanying drawings.

Figure 2:
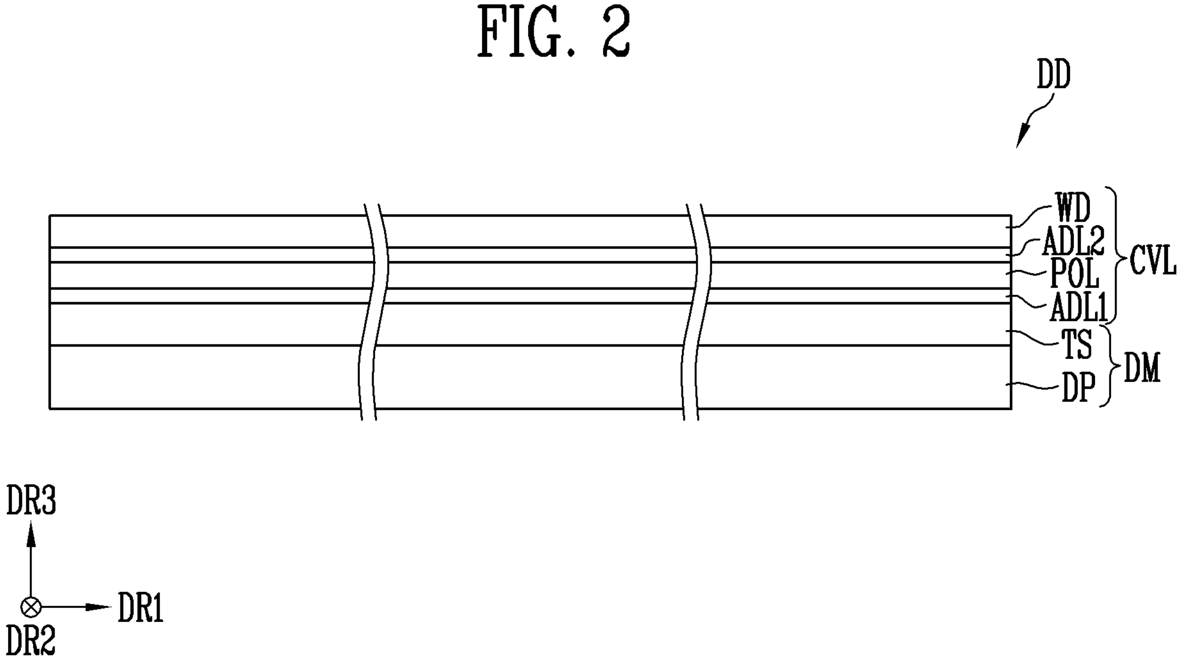
FIG. 2 illustrates a schematic cross-sectional view of the display device of FIG. 1.

FIG. 1 illustrates a schematic perspective view of a display device DD according to an embodiment, and FIG. 2 illustrates a schematic cross-sectional view of the display device DD of FIG. 1.

Referring to FIG. 1 and FIG. 2, an embodiment of the display device DD may include a display module DM and a cover layer CVL.

In an embodiment, the display device DD may be provided in various shapes, and as an example, may be provided in a rectangular plate shape having two pairs of sides parallel to each other, but is not limited thereto. In an embodiment where the display device DD is provided in the rectangular plate shape, sides of one pair of the two pairs of sides may be provided to be longer than sides of the other pair thereof. in FIG. 1 and FIG. 2, for better understanding and ease of description, an embodiment in which the display device DD has a rectangular shape having a pair of long sides and a pair of short sides is illustrated, and an extending direction of the long side is indicated as a first direction DR1, an extending direction of the short side is indicated as a second direction DR2, and a thickness direction of the display device DD is indicated as a third direction DR3. In an embodiment, where the display device DD is provided in a shape of a rectangular plate, a corner portion at which one long side and one short side contact each other may have a round shape.

At least a portion of the display device DD may have flexibility, and the display panel DP may be folded or foldable at the portion having the flexibility, but is not limited thereto.

The display device DD may include a display area DD_DA for displaying an image and a non-display area DD_NDA provided in at least one side of the display area DD_DA. The non-display area DD_NDA is an area in which an image is not displayed.

In some embodiments, the display device DD may include a sensing area and a non-sensing area. The display device DD not only may display an image through the sensing area, but also may detect a touch input on a display surface (or input surface) or may detect light incident from the front. The non-sensing area may surround the sensing area, but this is only an example, and is not limited thereto. In some embodiments, a partial area of the display area DD_DA may correspond to the sensing area.

In an embodiment, as shown in FIG. 2, the display module DM may include a display panel DP and a touch sensor TS.

The touch sensor TS may be directly disposed on the display panel DP, or may be disposed on the display panel DP with a separate layer such as an adhesive layer or a substrate interposed therebetween.

The display panel DP may display an image. In an embodiment, the display panel DP may be a display panel capable of self-luminous, such as an organic light emitting display panel (OLED panel). In an embodiment, the display panel DP may be a non-light emitting display panel such as a liquid crystal display panel (LCD panel), an electrophoretic display panel (EPD panel), or an electro-wetting display panel (EWD panel). In an embodiment where the display panel DP is the non-light emitting display panel, the display device DD may be provided with a backlight unit that supplies light to the display panel DP.

The touch sensor TS may be disposed on a surface on which an image of the display panel DP is emitted to receive a user's touch input. The touch sensor TS may recognize or detect a touch event of the display device DD through a user's hand or a separate input members. The touch sensor TS may recognize a touch event in a capacitance method.

The touch sensor TS may sense the touch input by using a mutual capacitance method, or may sense the touch input by using a self-capacitance method.

In an embodiment, the cover layer CVL may be disposed on the display module DM.

The cover layer CVL may include a polarizing film POL, first and second adhesive layers ADL1 and ADL2, and a window WD.

The polarizing film POL is provided between the touch sensor TS and the window WD, and may polarize light emitted from the display panel DP along a polarization axis. The polarizing film POL may be combined with the display module DM (or the touch sensor TS) through the first adhesive layer ADL1.

The first adhesive layer ADL1 may include a pressure sensitive adhesive that acts as an adhesive material when pressure to adhere to an adhesive surface is applied thereto. In an embodiment where the first adhesive layer ADL1 includes the pressure sensitive adhesive, the first adhesive layer ADL1 may be attached to the adhesive surface only with pressure without separate heat treatment or ultraviolet (UV) treatment at a room temperature.

The window WD for protecting an exposed surface of the display module DM may be provided on the polarizing film POL. The window WD may protect components disposed thereunder (for example, the display module DM) from an external impact, and may provide an input surface and/or a display surface to a user. The window WD may be combined with the display module DM by using the second adhesive layer ADL2. The second adhesive layer ADL2 may include an optically clear adhesive.

The window WD may have a multi-layered structure including at least one selected from a glass substrate, a plastic film, and a plastic substrate. The multi-layered structure may be formed through a continuous process or an adhesive process using an adhesive layer. The window WD may be entirely or partially flexible.

Herein, for better understanding and ease of description, a horizontal direction in a plan view is indicated as the first direction DR1, a vertical direction in a plan view is indicated as the second direction DR2, and a vertical direction in a cross-sectional view is indicated as the third direction DR3. The third direction DR3 may be a thickness direction of the display panel DP or the display device DD.

Figure 3:
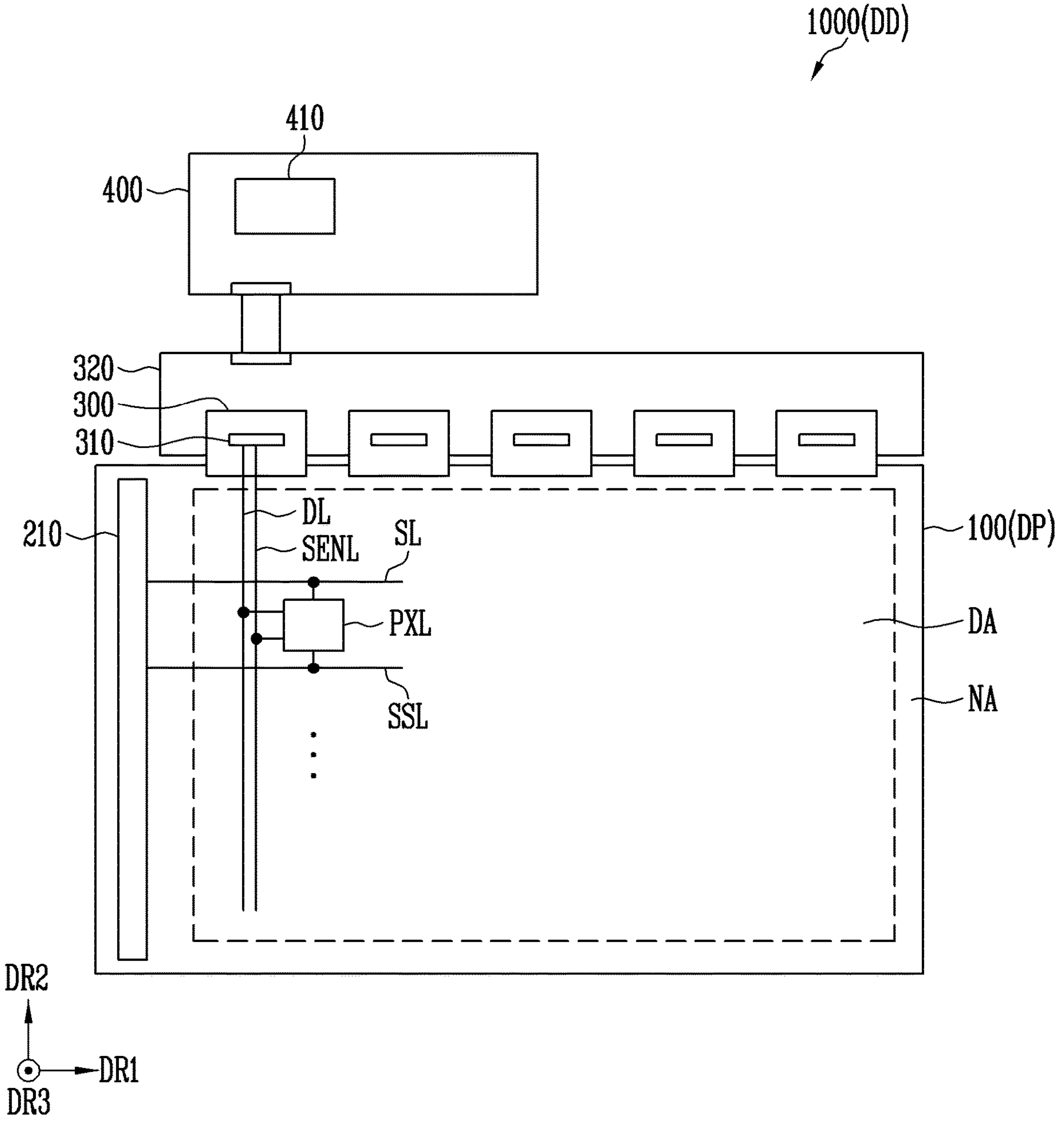
FIG. 3 illustrates a display device according to an embodiments of the invention.

FIG. 3 illustrates a display device according to an embodiment of the invention.

In an embodiment, as shown in FIG. 3, a display device may have a plurality of data drivers, or source driving integrated circuits (ICs). However, the disclosure is not limited thereto. In an alternative embodiment, for example, the present disclosure may also be applied to a display device having a single data driver (or a single source driving IC).

Referring to FIG. 3, an embodiment of a display device 1000 (DD) may include a display panel 100 (DP), a scan driver 210 (or a gate driver or a gate driving IC), a data driver 310 (or a source driver or a source driver IC), and a timing controller 410. The scan driver 210, the data driver 310, and the timing controller 410 may constitute or collectively define a display panel driving device that drives the display panel 100.

The display panel 100 may include a display area DA for displaying an image and a non-display area NA outside the display area DA. The display panel 100 may include a scan line SL, a sensing control line SSL, a data line DL, a sensing line SENL (or a read-out line), and a pixel PXL.

The pixel PXL may be connected to the scan line SL, the sensing control line SSL, the data line DL, and the sensing line SENL. In an embodiment, for example, the pixel PXL may be disposed in an area partitioned or defined by the scan line SL, the sensing control line SSL, the data line DL, and the sensing line SENL. The display panel 100 may include a plurality of pixels PXL, and for example, each of the plurality of pixels PXL may be connected to a corresponding data line DL and a corresponding sensing line SENL.

The timing controller 410 may control the scan driver 210 and the data driver 310. The timing controller 410 may receive a control signal (for example, a control signals including a clock signal) from the outside and generate a scan control signal (or a gate control signal) and a data control signal based on the control signal. The timing controller 410 may provide a scan control signal to the scan driver 210 and a data control signal to the data driver 310.

In an embodiment, the timing controller 410 may generate frame data (or image data) by rearranging input data provided from the outside (for example, a graphic processor).

In an embodiment, the timing controller 410 may be mounted on a control board 400.

The scan driver 210 and the data driver 310 may drive the display panel 100.

The scan driver 210 may receive a scan control signal from the timing controller 410, and may generate a scan signal and a sensing scan signal based on the scan control signal. The scan driver 210 may provide a scan signal to the scan line SL and a sensing scan signal to the sensing control line SSL.

In an embodiment, the scan driver 210 may be formed or provided on the display panel 100 together with the pixel PXL.

However, the disclosure is not limited thereto. In an embodiment, for example, the scan driver 210 may be mounted on at least one chip on film 300 (or a circuit film), and may be connected to the timing controller 410 mounted on the control board 400 via the chip on film 300 and a printed circuit board 320.

The data driver 310 may restore frame data in response to the data control signal received from the timing controller 410. In addition, in a first period (for example, a display period in which an image is displayed on the display panel 100), the data driver 310 may generate a data signal corresponding to the frame data and provide the data signal to the data line DL.

In a second period different from the first period (for example, a sensing period that senses a threshold voltage and/or mobility of a driving transistor included in the pixel PXL as characteristic information of the pixel PXL), the data driver 310 may receive at least one sensing signal (or sensing value) from at least one pixel of the pixels through the sensing line SENL.

In an embodiment, for example, the second period is a vertical blank period (or a vertical porch period) between the first period and the adjacent first period (for example, another frame period), the data driver 310 may receive a sensing signal (for example, the mobility of the driving transistor, a signal related thereto, and the like) from the pixels PXL. In an alternative embodiment, for example, the second period is a period immediately before the display device 1000 is powered off, and the data driver 310 may sequentially receive sensing signals (for example, threshold voltages of respective driving transistors of the pixels) from pixels including the pixel PXL in units of pixel rows.

The data driver 310 may be mounted on the chip on film 300, and may be connected to the timing controller 410 via at least one printed circuit board 320 and/or cable.

Figure 4:
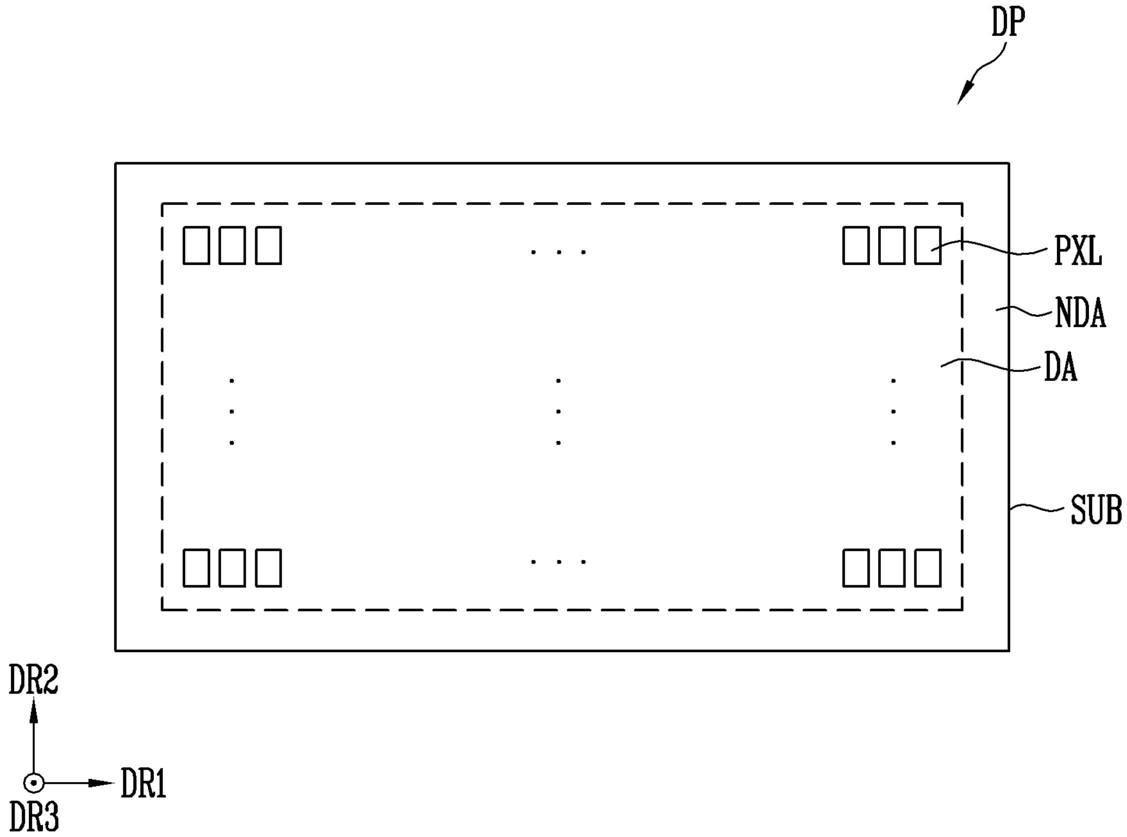
FIG. 4 illustrates a schematic top plan view of a display panel of FIG. 2.

FIG. 4 illustrates a schematic top plan view of a display panel of FIG. 2.

Referring to FIG. 4, the display panel DP according to an embodiment may include a substrate SUB and a plurality of pixels PXL provided on the substrate SUB.

In an embodiment, one area having an approximately rectangular shape may be provided or defined in the substrate SUB. However, the number of areas provided in the substrate SUB may be variously modified, and the shape of the substrate SUB may have a different shape depending on the area provided in the substrate SUB.

The substrate SUB may include or be made of an insulating material such as glass or a resin. In an embodiment, the substrate SUB may include or be made of a flexible material to be bendable or foldable, and may have a single-layered structure or a multi-layered structure. In an embodiment, for example, the flexible material may include at least one selected from polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate. However, the material included in the substrate SUB is not limited thereto.

The substrate SUB may include a display area DA and a non-display area NDA. The display area DA may be an area in which the pixels PXL are provided to display an image, and the non-display area NDA may be an area in which the pixels PXL are not provided and no image is displayed.

The display area DA of the display panel DP may correspond to the display area DD_DA of the display device DD, and the non-display area NDA of the display panel DP may be correspond to the non-display area DD_NDA of the display device DD.

A driver for driving the pixels PXL and some of wires (for example, fan-out lines) connecting the pixels PXL and the driver may be provided in the non-display area NDA. The non-display area NDA may correspond to a bezel area of the display device DD.

The pixels PXL may be provided in the display area DA of the substrate SUB. Each of the pixels PXL may be a minimum or basic unit that displays an image. The pixels PXL may include light emitting elements that emits white light and/or color light. Each of the pixels PXL may emit one color of red, green, and blue, but is not limited thereto, and may emit a color such as cyan, magenta, or yellow.

The pixels PXL may be disposed in a matrix form along rows (or pixel rows) extending in the first direction DR1 and columns (or pixel columns) extending in the second direction DR2 crossing the first direction DR1. However, the disposition form of the pixels PXL is not particularly limited thereto, and the pixels PXL may be disposed in various forms. In the drawing, the pixels PXL are shown to have a rectangular shape, but are not limited thereto, and may be changed in various shapes. In addition, when a plurality of pixels PXL are provided, the pixels PXL may be provided to have different areas (or sizes) from each other. In an embodiment, for example, where the pixels PXL emit light of different colors from each other, the pixels PXL may be provided in different areas (or sizes) or in different shapes from each other.

The driver may provide a signal and a power source to each of the pixels PXL through a wire portion to control driving of the pixels PXL.

Figure 5:
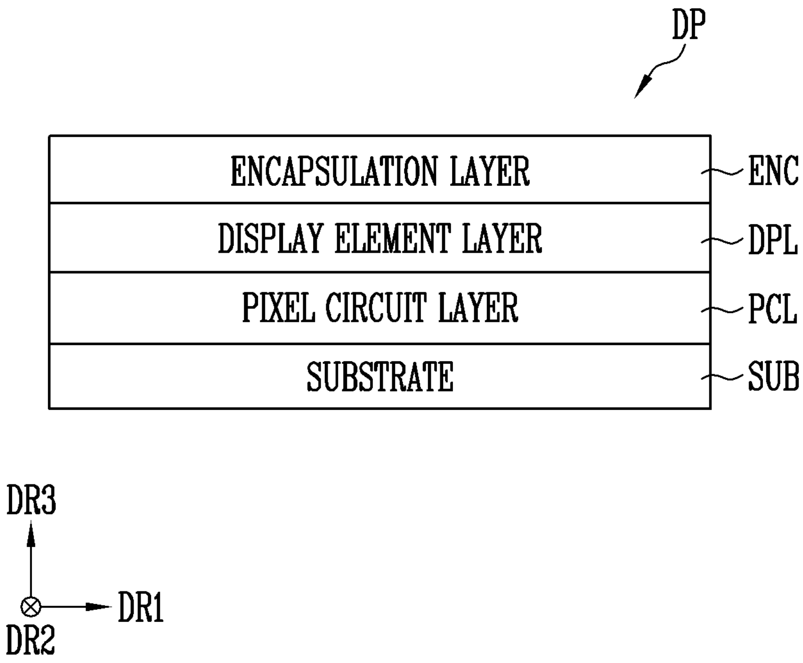
FIG. 5 illustrates a schematic cross-sectional view of a display panel of FIG. 2.

FIG. 5 illustrates a schematic cross-sectional view of a display panel of FIG. 2.

In an embodiment, the display panel DP, as shown in FIG. 5, may include a pixel circuit layer PCL, a display element layer DPL, and an encapsulation layer ENC that are sequentially disposed on the substrate SUB.

The pixel circuit layer PCL is provided on the substrate SUB, and may include a plurality of transistors and signal lines connected to the transistors. In an embodiment, for example, each transistor may have a structure in which a semiconductor layer, a gate electrode, a first terminal, and a second terminal are sequentially stacked with an insulating layer interposed therebetween. The semiconductor layer may include an amorphous silicon, a poly silicon, a low temperature poly silicon, an organic semiconductor, and/or an oxide semiconductor. The gate electrode, the first terminal, and the second terminal may include at least one selected from aluminum (Al), copper (Cu), titanium (Ti), and molybdenum (Mo), but are not limited thereto. In addition, the pixel circuit layer PCL may include at least one or more insulating layers.

The display element layer DPL may be disposed on the pixel circuit layer PCL. The display element layer DPL may include a light emitting element that emits light. The light emitting element may be, for example, an organic light emitting diode, but is not limited thereto. In some embodiments, the light emitting element may be an inorganic light emitting element including an inorganic light emitting material or a light emitting element that emits light by changing a wavelength of light emitted by using a quantum dot.

The encapsulation layer ENC may be disposed on the display element layer DPL. The encapsulation layer ENC may be an encapsulation substrate or a multi-layered encapsulation film. In an embodiment where the encapsulation layer ENC is in a form of the encapsulation film, the encapsulation layer ENC may include an inorganic film and/or an organic film. In an embodiment, for example, the encapsulation layer ENC may have a structure in which an inorganic film, an organic film, and an inorganic film are sequentially stacked. The encapsulation layer ENC may effectively prevent external air and moisture from penetrating into the display element layer DPL and the pixel circuit layer PCL.

Figure 6:
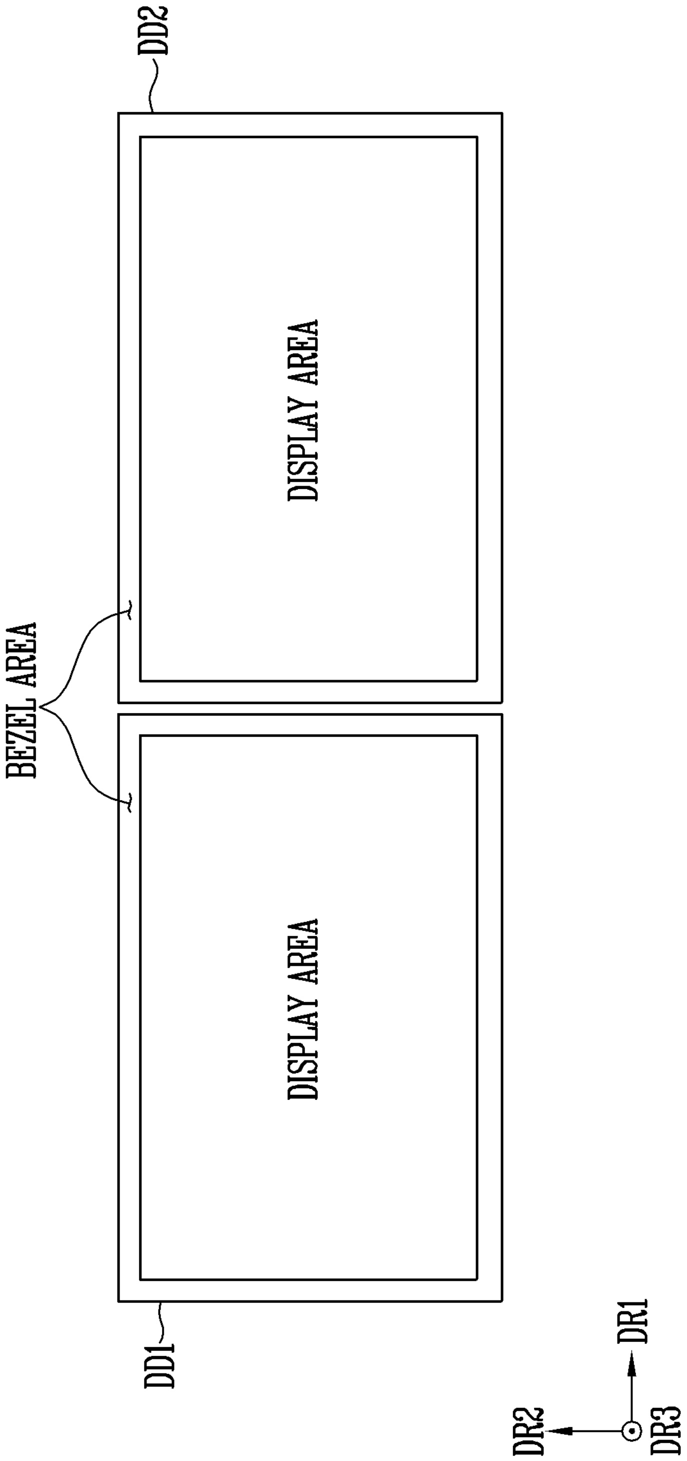
FIG. 6 is a drawing illustrating a multi-display device according to an embodiment.

FIG. 6 is a drawing illustrating a multi-display device according to an embodiment.

An embodiment of a multi-display device may refer to a device that outputs a screen to the outside by using a plurality of display devices. In such an embodiment, each of the plurality of display devices may output a separate independent image or the plurality of display devices may collectively display one image by outputting an image allocated thereto among a plurality of divided images of the one image.

In an embodiment, referring to FIG. 6, the multi-display device may include a first display device DD1 and a second display device DD2. The first display device DD1 and the second display device DD2 may output separate images, respectively, or collectively display one image by outputting divided images of the one image, respectively. When the first display device DD1 and the second display device DD2 respectively output divided images, the one image may be divided into two images. In this case, one of the two divided images may be outputted by the first display device DD1, and the other thereof may be outputted by the second display device DD2. The image may be divided by a separate application processor (AP) (not shown) or a display driving integrated circuit (IC) (not shown) to which the first display device DD1 and the second display device DD2 are connected. Each of the first display device DD1 and the second display device DD2 may output the divided image to the outside through the display panel based on the image signal corresponding to the image allocated thereto received from the outside.

Each of the first display device DD1 and the second display device DD2 may include a bezel area. The bezel area may be an area excluding a display area in which pixels are disposed. That is, the bezel area may correspond to the non-display area NDA of FIG. 4. Various wires and/or embedded circuit portions connected to pixels of the display area may be disposed in the bezel area. Pixels may not be disposed in the bezel area. Therefore, as shown in FIG. 6, when the first display device DD1 and the second display device DD2 are arranged side by side to divide and output one image, a sense of disconnection of the image may be intensified in a boundary area where the first display device DD1 and the second display device DD2 are adjacent to each other.

Figure 7:
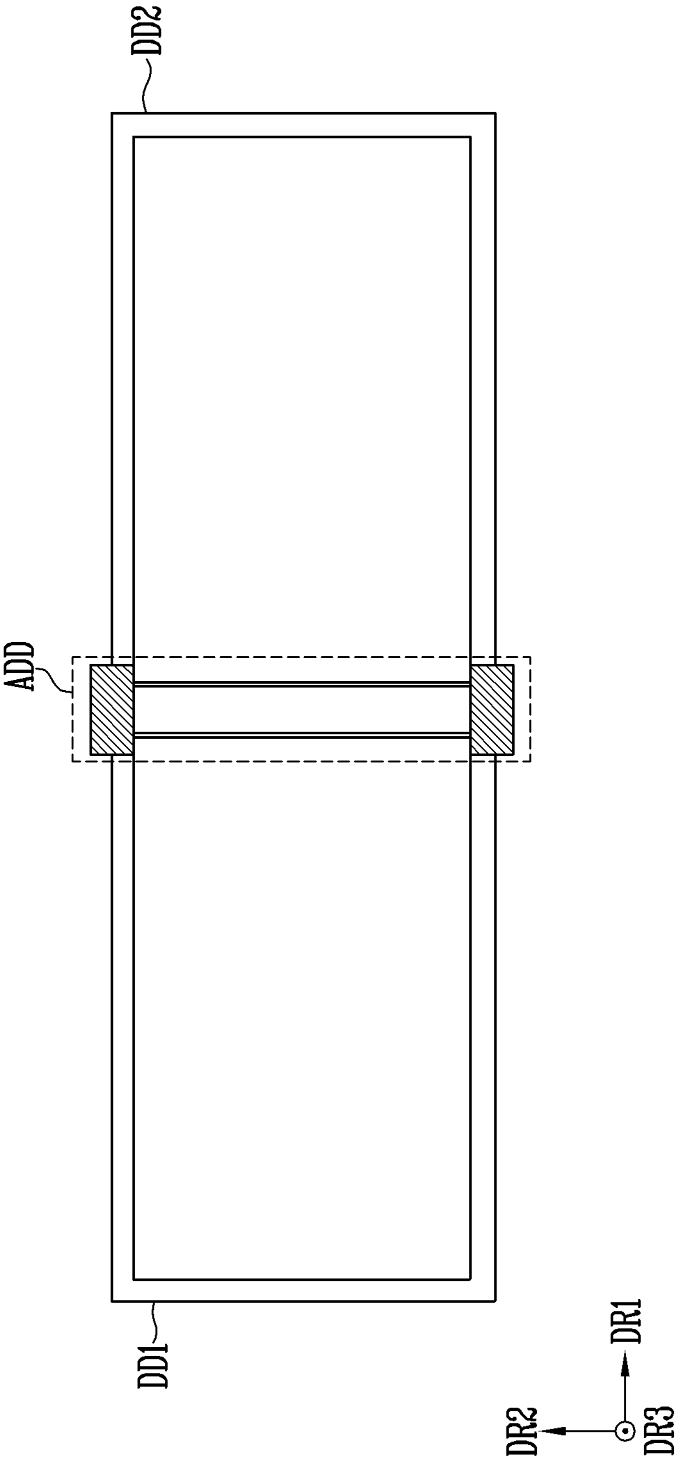
FIG. 7 is a drawing illustrating a multi-display device according to an embodiment.

FIG. 7 is a drawing illustrating a multi-display device according to an embodiment.

Referring to FIG. 7, the multi-display device according to an embodiment may further include an auxiliary display device ADD. The auxiliary display device ADD may be disposed to cover the bezel areas of the first display device DD1 and the second display device DD2 in the boundary area between the first display device DD1 and the second display device DD2. Referring to FIG. 7, the auxiliary display device ADD may include upper and lower fixing portions respectively connected to upper and lower ends of a display panel of the auxiliary display device ADD. The upper fixing portion may be coupled to the upper end of the first display device and the upper end of the second display device in the boundary area between the first display device and the second display device. The lower fixing portion may be coupled to the lower end of the first display device and the lower end of the second display device in the boundary area between the first display device and the second display device. The auxiliary display device ADD may be stably coupled to the first display device DD1 and the second display device DD2 by an upper fixing portion and a lower fixing portion.

The bezel of the auxiliary display device ADD may be narrower than the bezel of the first display device DD1 and the bezel of the second display device DD2. Regarding the bezel of the auxiliary display device ADD, the bezel disclosed in Korean Registered Patent No. 10-2405932 is referred to herein. In the auxiliary display device according to an embodiment, for example, the bezel area of the display panel may be reduced by bending one end of the substrate to be disposed on the rear surface of the display area or supplying driving power using a link line with a multi-layered structure.

Referring to FIG. 7, the auxiliary display device ADD is disposed in the boundary area between the first display device DD1 and the second display device DD2 to be driven together with the first display device DD1 and the second display device DD2, so that an image that continues naturally without being disconnected may be displayed in the boundary area.

In an embodiment, one image may be divided into three images and then simultaneously output through the first display device DD1, the second display device DD2, and the auxiliary display device. In such an embodiment, one of the three divided images may be output by the first display device DD1, another thereof may be output by the second display device DD2, and the other thereof may be output by the auxiliary display device ADD. The image may be divided by a separate AP (not shown) or display driving IC (not shown) to which the first display device DD1, the second display device DD2, and the auxiliary display device are connected together. Each of the first display device DD1, the second display device DD2, and the auxiliary display device ADD may output the divided image to the outside through the display panel based on the image signal corresponding to the image allocated thereto received from the outside.

In an embodiment, the auxiliary display device ADD may include the touch sensor TS described with reference to FIG. 2. In such an embodiment, the auxiliary display device ADD may recognize an external touch input by including the touch sensor TS, and thus may be combined with the first display device DD1 and the second display device DD2 to be used as an additional input device.

Figure 8A:
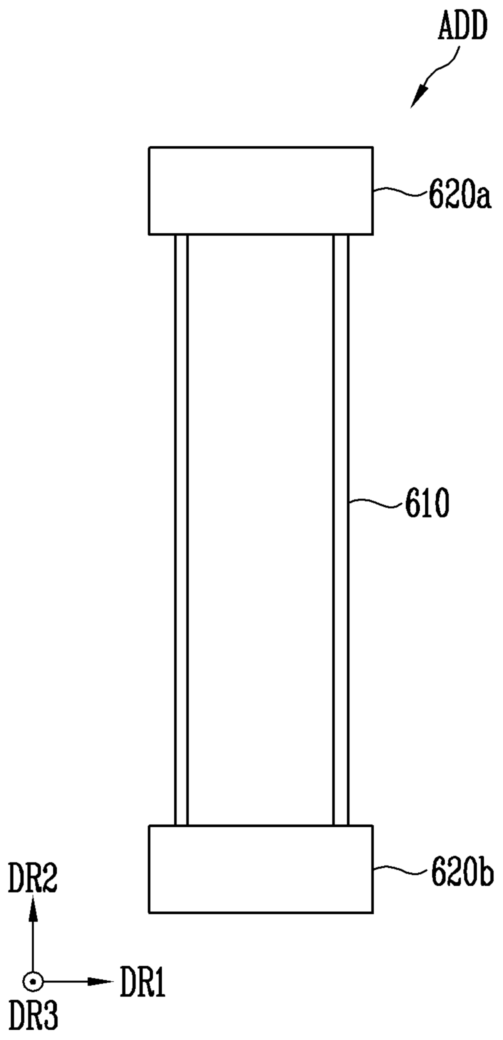
FIG. 8A illustrates a front view of an auxiliary display device according to an embodiment.
Figure 8B:
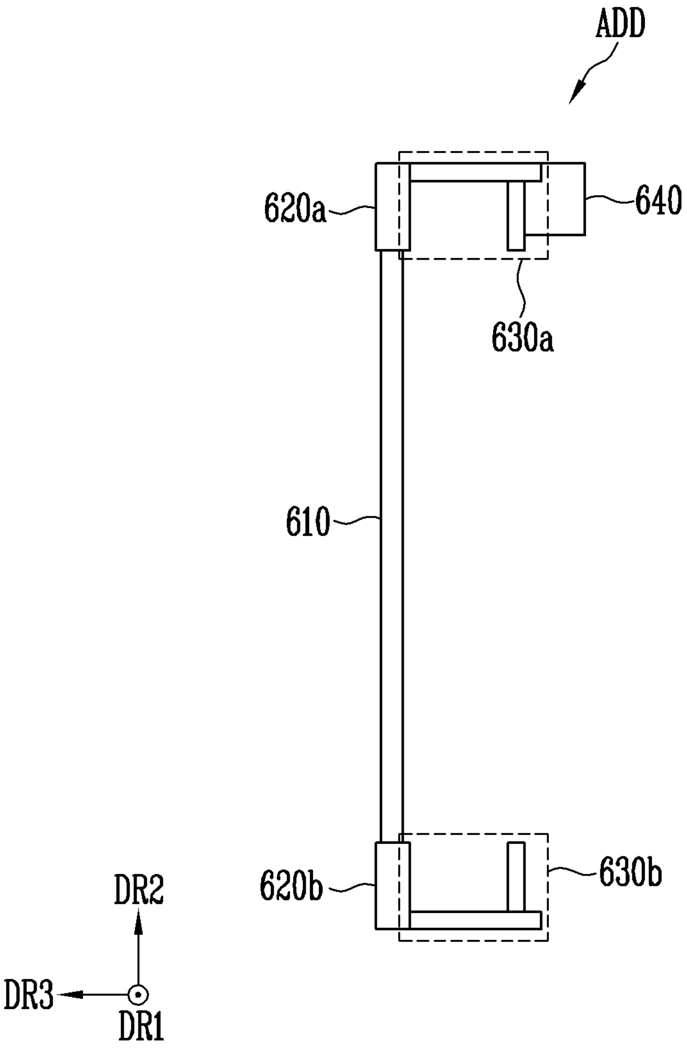
FIG. 8B illustrates a side view of an auxiliary display device according to an embodiment.

FIG. 8A and FIG. 8B are drawings illustrating a detailed configuration of the auxiliary display apparatus according to the embodiment of FIG. 7.

FIG. 8A illustrates a front view of the auxiliary display device ADD according to an embodiment, and FIG. 8B illustrates a side view of the auxiliary display device ADD according to an embodiment.

Referring to FIG. 8A and FIG. 8B, an embodiment of the auxiliary display device ADD may include a display panel 610, an upper holder 620*a*, a lower holder 620*b*, an upper fixing portion 630*a*, a lower fixing portion 630*b*, and a driver 640.

One end of the upper holder 620*a* may be connected to an upper end of the display panel 610, and the other end (i.e., an opposing end opposite to the one end) thereof may be connected to the upper fixing portion 630*a*. One end of the lower holder 620*b* may be connected to a lower end of the display panel 610, and the other end thereof may be connected to the lower fixing portion 630*b*. The upper holder 620*a* and the lower holder 620*b* may be connected to the display panel 610 so that the display panel may not move while the auxiliary display device ADD is coupled to other display devices (for example, the first and second display devices in FIG. 7).

One end of the upper fixing portion 630*a* is connected to the upper holder 620*a*, and the other end thereof may extend in a direction directly opposite to the front direction of the display panel. When one edge of the first display device DD1 of FIG. 7 and one edge of the second display device DD2 of FIG. 7 are adjacent to each other, the upper fixing portion 630*a* may fix the upper end of the auxiliary display device ADD to the upper end of the first display device and the upper end of the second display device.

One end of the lower fixing portion 630*b* is connected to the lower holder 620*b*, and the other end thereof may extend in a direction directly opposite to the front direction of the display panel. When one edge of the first display device DD1 of FIG. 7 and one edge of the second display device DD2 of FIG. 7 are adjacent to each other, the lower fixing portion 630*b* may fix the lower end of the auxiliary display device ADD to the lower end of the first display device and the lower end of the second display device.

The driver 640 may be connected to the upper fixing portion 630*a*. The driver 640 may include a driving circuit (not shown) connected to the display panel 610 to provide driving signals to pixels included in the display panel 610, and a power supply (not shown) to supply power to the display panel 610. The driving circuit may be the data driver 310 and/or the timing controller 410 described with reference to FIG. 3. In an embodiment, for example, the driving circuit and the power supply included in the driver 640 may be connected to the display panel 610 through a chip on film (COF) or flexible printed circuit board (FPCB) having one end connected to the upper portion of the display panel 610. The driving circuit and the power supply may supply driving signals and power to pixels included in the display panel 610 through the COF or FPCB.

In an embodiment where the auxiliary display device ADD includes the touch sensor as described with reference to FIG. 7, the driver 640 may further include a touch driving circuit connected to the touch sensor. The touch driving circuit may be connected to the touch sensor to sense a touch input from the outside through the touch sensor.

Although FIG. 8B shows an embodiment where the driver 640 is connected to the upper fixing portion 630*a*, a configuration in which the driver 640 is connected and a position at which the driver 640 is connected in the auxiliary display device ADD are not limited to the embodiments. In an alternative embodiment, for example, the driver 640 may be connected to the lower fixing portion 630*b* to be disposed at the lower end of the auxiliary display device ADD or at the side of the display panel 610.

Figure 9A:
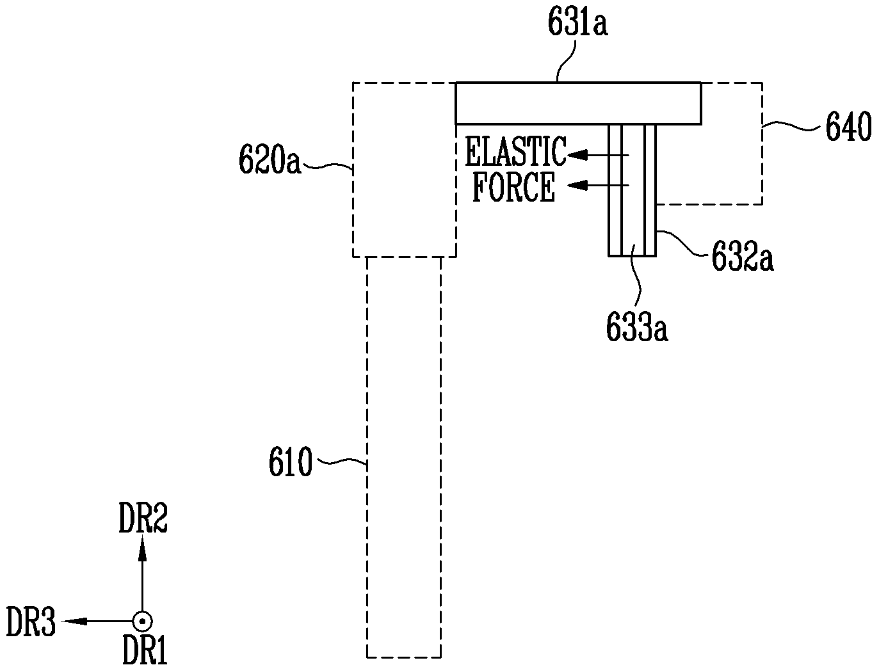
FIG. 9A illustrates a side view of an upper fixing portion according to an embodiment.
Figure 9B:
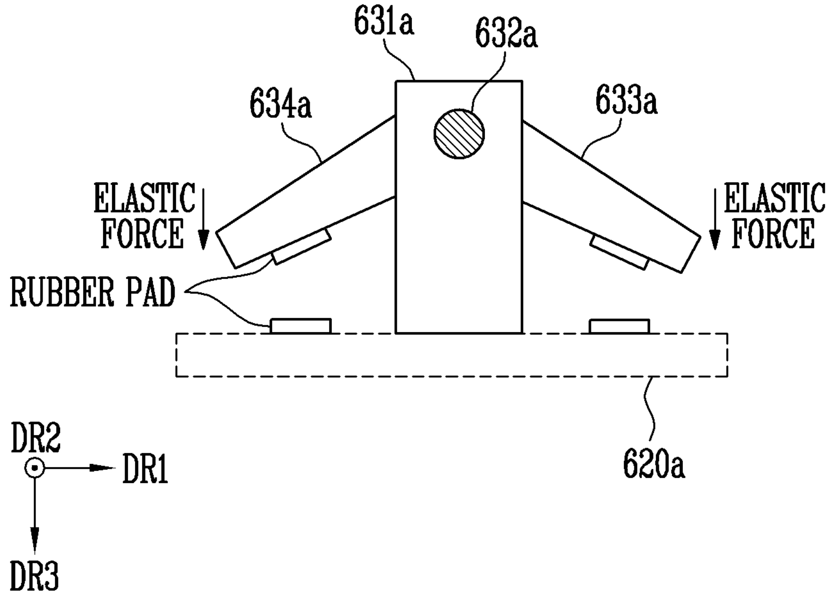
FIG. 9B illustrates a plan view of the upper fixing portion of FIG. 8A as viewed from above.
Figure 9C:
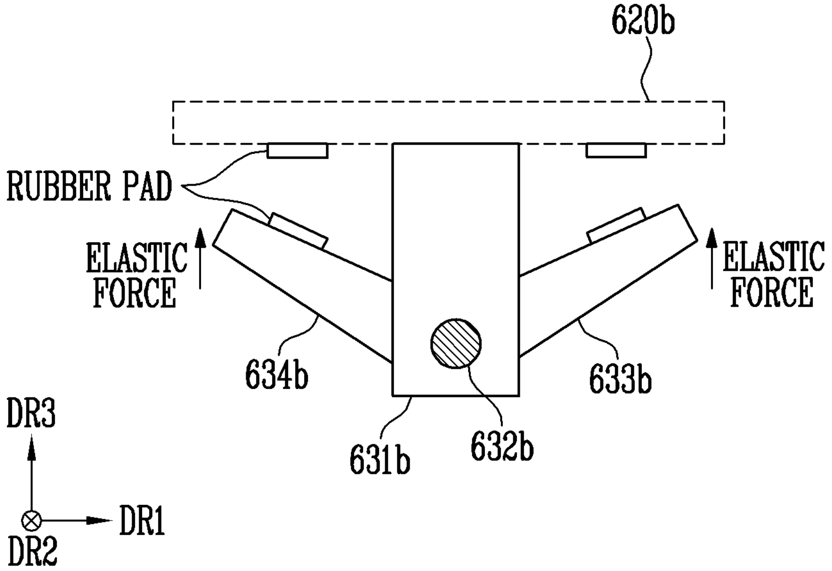
FIG. 9C illustrates a plan view of a lower fixing portion of FIG. 8A as viewed from below.

FIG. 9A, FIG. 9B, and FIG. 9C are drawings illustrating in detail the configurations of the upper fixing portion and the lower fixing portion.

FIG. 9A illustrates a side view of the upper fixing portion, FIG. 9B illustrates a plan view of the upper fixing portion of FIG. 8A as viewed from above, and FIG. 9C illustrates a plan view of a lower fixing portion of FIG. 8A as viewed from below.

Although only the side view of the upper fixing portion is shown in FIG. 9A, a detailed configuration of the lower fixing portion and a connection relationship between the components thereof are the same as those of the upper fixing portion, and thus the side view of the lower fixing portion is omitted in FIG. 9A.

Referring to FIG. 9A and FIG. 9B, in an embodiment, the upper fixing portion 630*a* may include a first support member 631*a*, a first rotation shaft 632*a*, a first arm 633*a*, and a second arm 634*a*.

The first support member 631*a* may have one end connected to the upper holder 620*a* and the other end extending from the rear surface of the upper holder 620*a* in a direction perpendicular to the rear surface of the upper holder 620*a*. In a state in which the auxiliary display device ADD is coupled to the first display device DD1 and the second display device DD2 of FIG. 7, the first support member 631*a* may support the upper surface of the first display device DD1 and the upper surface of the second display device DD2.

From a connection point between the first support member 631*a* and the upper holder 620*a*, the first rotation shaft 632*a* may be connected to the rear surface of the first support member 631*a*, which is a predetermined distance away from the rear surface of the upper holder 620*a*. The first rotation shaft 632*a* may have one end connected to the first support member 631*a*, and may extend by a predetermined length in a direction perpendicular to the rear surface of the first support member 631*a*.

The first arm 633*a* and the second arm 634*a* may be connected to the first rotation shaft 632*a*. The first arm 633*a* may have one end connected to the first rotation shaft 632*a*, and may be extended by a predetermined length in a direction perpendicular to the outside of a circumferential surface of the first rotation shaft 632*a*. The first arm 633*a* may rotate with respect to the first rotation shaft. The second arm 634*a* may have one end connected to the first rotation shaft 632*a*, and may be extended by a predetermined length in a direction perpendicular to the outside of a circumferential surface of the first rotation shaft 632*a*. In such an embodiment, directions in which the first arm 633*a* and the second arm 634*a* extend may be opposite to each other. In addition, directions in which the first arm 633*a* and the second arm 634*a* rotate may be opposite to each other.

In an embodiment, the first arm 633*a* and the second arm 634*a* may be connected to the first rotation shaft 632*a* through an elastic member. The elastic member may provide an elastic force to the other end of the first arm 633*a* (one end in the opposite direction to one end connected to the first rotation shaft) and the other end of the second arm 634*a* in the rear direction of the upper holder 620*a* (in the third direction DR in FIG. 9B).

In a state in which the auxiliary display device ADD is coupled to the first display device DD1 and the second display device DD2 of FIG. 7, by the elastic force provided to the other end of the first arm 633*a* and the other end of the second arm 634*a*, the auxiliary display device ADD may be more firmly fixed to the upper surface of the first display device DD1 and the upper surface of the second display device DD2.

A rubber pad may be attached to a portion where the first arm 633*a* and the second arm 634*a* are in contact with the upper surface of the first display device DD1 and the upper surface of the second display device DD2, respectively. In addition, a rubber pad may be attached to a portion where the rear surface of the upper holder 620*a* is in contact with the upper surface of the first display device DD1 and the upper surface of the second display device DD2, respectively. Accordingly, the upper surface of the first display device DD1 and the upper surface of the second display device DD2 may be effectively prevented from being damaged due to contact with the first arm 633*a* and the second arm 634*a*.

Referring to FIG. 9C, the lower fixing portion 630*b* may include a second support member 631*b*, a second rotation shaft 632*b*, a third arm 633*b*, and a fourth arm 634*b*.

The second support member 631*b* may have one end connected to the lower holder 620*b* and the other end extending from the rear surface of the lower holder 620*b* in a direction perpendicular to the rear surface of the lower holder 620*b*. In a state in which the auxiliary display device ADD is coupled to the first display device DD1 and the second display device DD2 of FIG. 7, the second support member 631*b* may support the lower surface of the first display device DD1 and the lower surface of the second display device DD2.

From a connection point between the second support member 631*b* and the lower holder 620*b*, the second rotation shaft 632*b* may be connected to the rear surface of the second support member 631*b*, which is a predetermined distance away from the rear surface of the lower holder 620*b*. The second rotation shaft 632*b* may have one end connected to the second support member 631*b*, and may extend by a predetermined length in a direction perpendicular to the rear surface of the second support member 631*b*.

The third arm 633*b* and the fourth arm 634*b* may be connected to the second rotation shaft 632*b*. The third arm 633*b* may have one end connected to the second rotation shaft 632*b*, and may be extended by a predetermined length in a direction perpendicular to the outside of a circumferential surface of the second rotation shaft 632*b*. The third arm 633*b* may rotate with respect to the second rotation shaft 632*b*. The fourth arm 634*b* may have one end connected to the second rotation shaft 632*b*, and may be extended by a predetermined length in a direction perpendicular to the outside of a circumferential surface of the second rotation shaft 632*b*. In such an embodiment, directions in which the third arm 633*b* and the fourth arm 634*b* extend may be opposite to each other. In addition, directions in which the third arm 633*b* and the fourth arm 634*b* rotate may be opposite to each other.

In an embodiment, the third arm 633*b* and the fourth arm 634*b* may be connected to the second rotation shaft 632*b* through an elastic member. The elastic member may provide an elastic force to the other end of the third arm 633*b* (one end in the opposite direction to one end connected to the second rotation shaft) and the other end of the fourth arm 634*b* in the rear direction of the lower holder 620*b* (in the third direction DR in FIG. 9C).

In a state in which the auxiliary display device ADD is coupled to the first display device DD1 and the second display device DD2 of FIG. 7, by the elastic force provided to the other end of the third arm 633*b* and the other end of the fourth arm 634*b*, the auxiliary display device ADD may be more firmly fixed to the lower surface of the first display device DD1 and the lower surface of the second display device DD2.

A rubber pad may be attached to a portion where the third arm 633*b* and the fourth arm 634*b* are in contact with the lower surface of the first display device DD1 and the lower surface of the second display device DD2, respectively. In addition, a rubber pad may be attached to a portion where the rear surface of the lower holder 620*b* is in contact with the lower surface of the first display device DD1 and the lower surface of the second display device DD2, respectively. Accordingly, the lower surface of the first display device DD1 and the lower surface of the second display device DD2 may be effectively prevented from being damaged due to contact with the third arm 633*b* and the fourth arm 634*b*. In an embodiment, a distance between the first rotation shaft 632*a* and the upper holder 620*a* may be longer than a thickness of the first display device DD1 and a thickness of the second display device DD2. In addition, a distance between the second rotation shaft 632*b* and the lower holder 620*b* may be longer than the thickness of the first display device DD1 and the thickness of the second display device DD2.

Figure 10A:
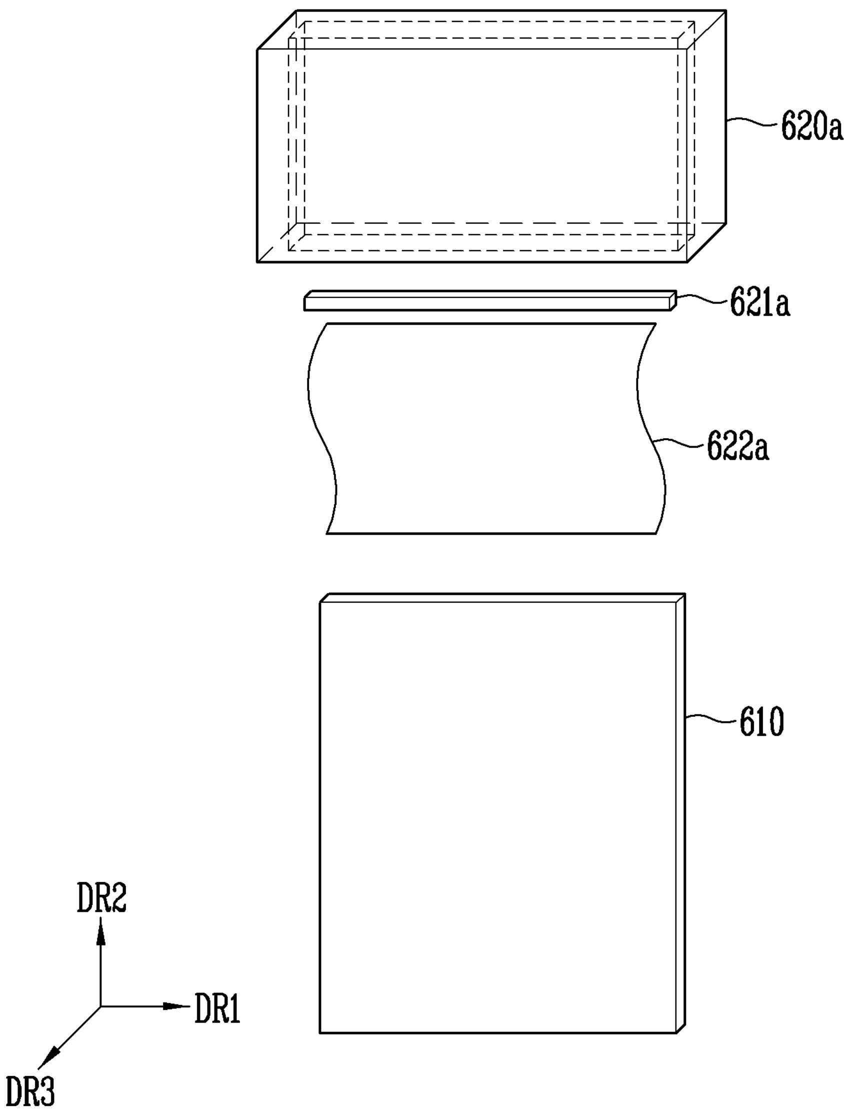
FIG. 10A illustrates a state in which components of an upper holder are separated from the upper holder.
Figure 10B:
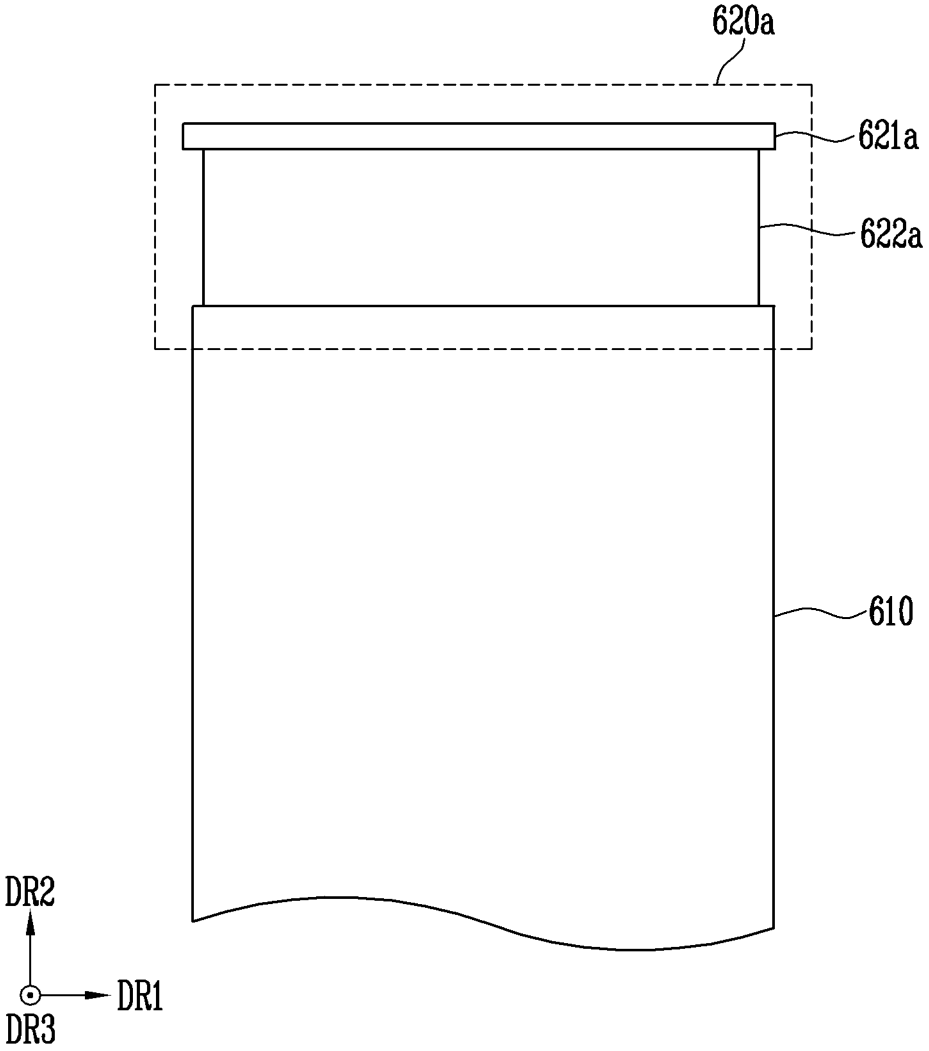
FIG. 10B illustrates a state in which components of an upper holder are coupled to the upper holder.

FIG. 10A and FIG. 10B are drawings illustrating detailed configurations of the upper holder and the lower holder according to an embodiment.

FIG. 10A illustrates a state in which components of the upper holder are separated from the upper holder, and FIG. 10B illustrates a state in which components of the upper holder are coupled to the upper holder.

For better understanding and ease of description, although respective components of the upper holder are shown in FIG. 10 as being separated, detailed components of the upper holder may be in a combined state.

Although only the upper holder is shown in FIG. 10A and FIG. 10B, a detailed configuration of the lower holder and a connection relationship between the components are the same as those of the upper holder, so the illustration of the lower holder is omitted in FIG. 10A and FIG. 10B.

Referring to FIG. 10A and FIG. 10B, the upper holder 620*a* may include a groove defined in a portion thereof corresponding to an upper end portion of the display panel 610, and a clamp 621*a* disposed on an inner surface of the upper holder 620*a*.

In an embodiment, the upper holder 620*a* may include a groove defined or formed in a lower surface of the upper holder 620*a*. In such an embodiment, the upper end portion of the display panel 610 may be inserted into an empty space inside the upper holder 620*a* through the groove in the lower surface of the upper holder 620*a*, and the upper end of the display panel 610 may be connected to the clamp 621*a* disposed in the inner surface of the upper holder 620*a*. The upper end portion of the display panel 610 may be fixed to the upper holder 620*a* by the clamp 621*a*.

In an embodiment, the display panel 610 may be connected to the first clamp 621*a* through a first connection member 622*a*. The first connection member 622*a* may include an elastic material or a stretchable material. In such an embodiment, the first connection member 622*a* may have the same configuration as the chip on film 300 described with reference to FIG. 3 or the same configuration as the printed circuit board 320. In such an embodiment, the chip on film 300 or the printed circuit board 320 may have a property of being stretched by an external force. However, the present disclosure is not limited thereto, and the first connection member 622*a* may be a separate component from the chip on film 300 or the printed circuit board 320 of FIG. 3, and may be a component for simply connecting the display panel 610 to the upper holder 620*a*.

Although not specifically shown in FIG. 10*a* and FIG. 10*b*, the lower holder 620*b* of FIG. 7 may include a groove in a portion thereof corresponding to a lower end portion of the display panel 610 and a clamp disposed on the inner surface of the lower holder 620*b*, similar to the upper holder 620*a*, and the lower end of the display panel 610 may be connected to the clamp of the lower holder 620*b* by a connection member including a stretchable material.

In an alternative embodiment, the display panel 610 may be connected to the upper holder 620*a* and the lower holder 620*b* in a bent form. In such an embodiment, the display panel 610 may include a flexible material. In addition, the clamp connected to the upper and lower end portions of the display panel 610 may be bent in a same form as the display panel. In this case, the clamp may include a flexible material.

Figure 10C:
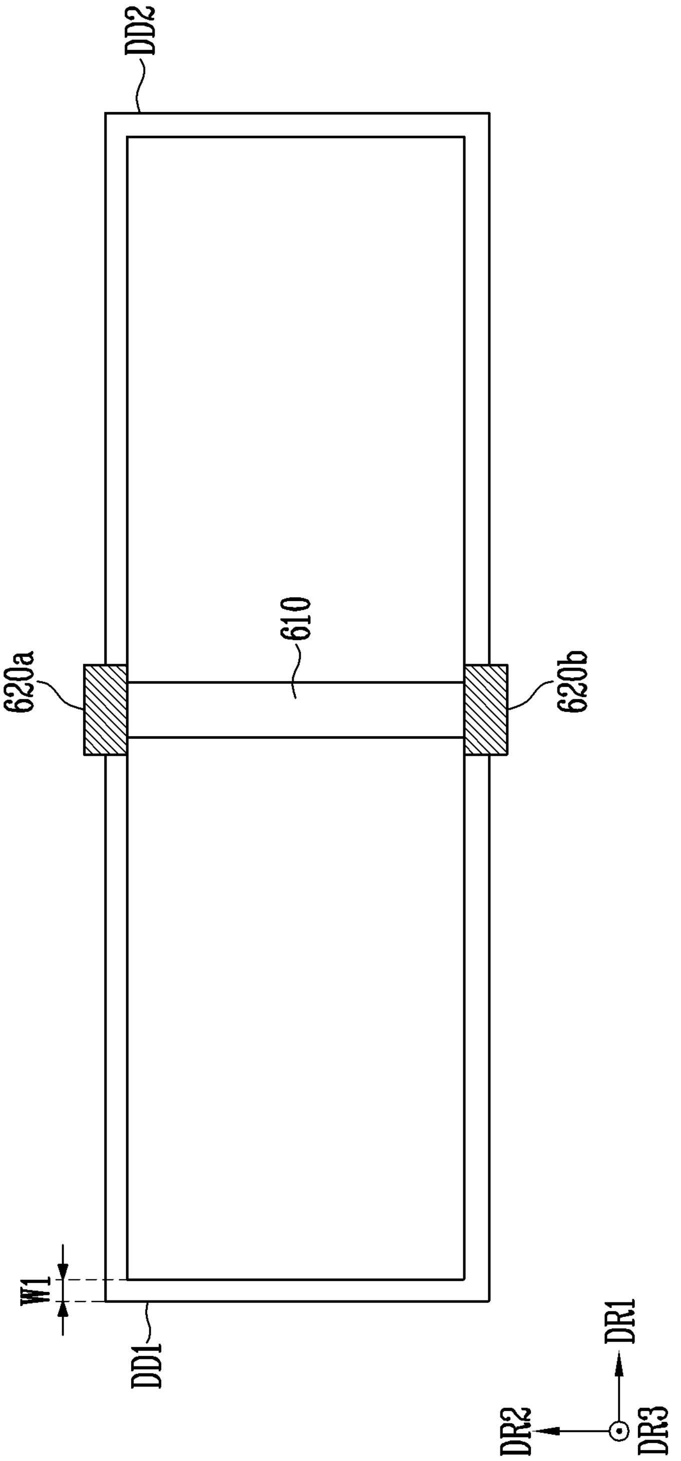
FIG. 10C is a drawing illustrating an example in which an auxiliary display device according to an embodiment is coupled to a display device.
Figure 10D:
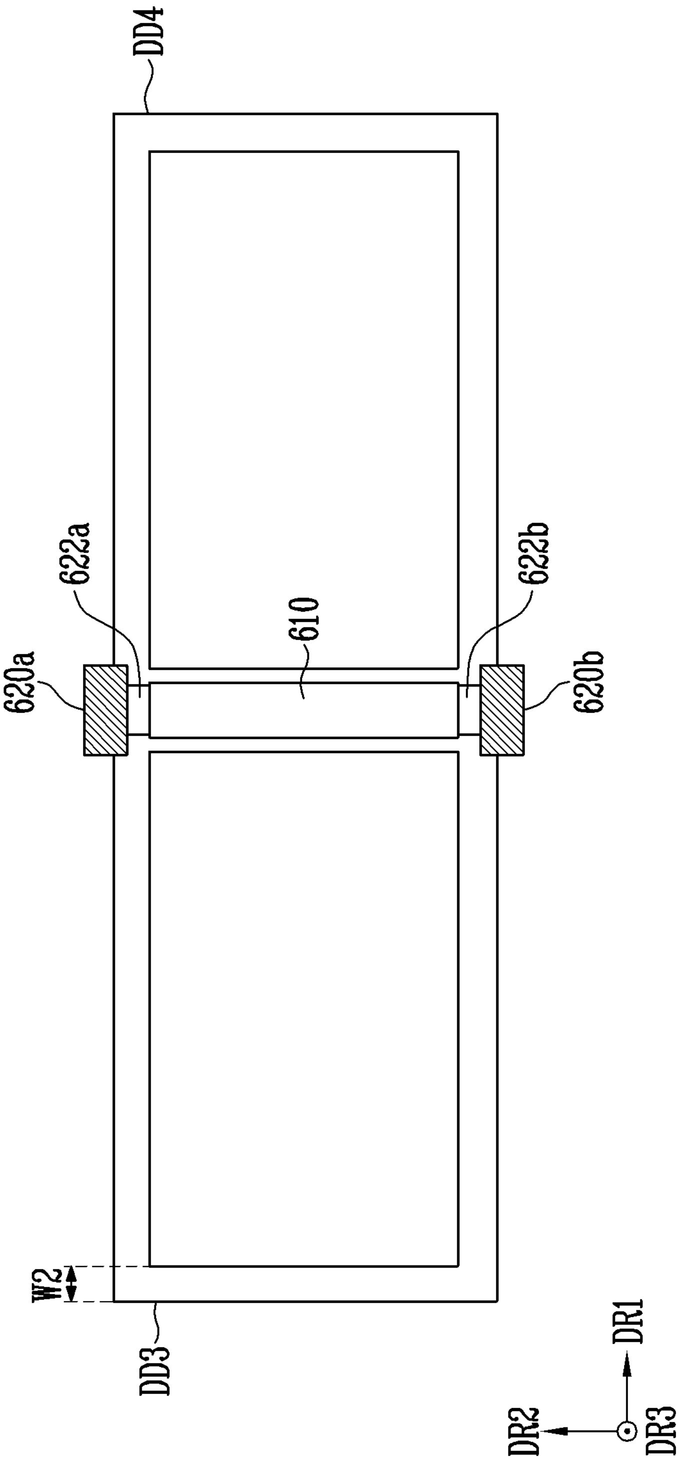
FIG. 10D is a drawing illustrating another example in which an auxiliary display device according to an embodiment is coupled to a display device.

FIG. 10C and FIG. 10D are drawings illustrating an example in which an auxiliary display device according to an embodiment is coupled to a display device.

Referring to FIG. 10C, the auxiliary display device according to an embodiment may be combined to the first display device DD1 and the second display device DD2. Widths of the bezel areas of the first display device DD1 and the second display device DD2 may be W1. Referring to FIG. 10D, the auxiliary display device according to an embodiment may be coupled to a third display device DD3 and a fourth display device DD4. Widths of the bezel areas of the third display device DD3 and the fourth display device DD4 may be W2.

In an embodiment, the width W1 of the bezel areas of the first display device DD1 and the second display device DD2 may be different from the width W2 of the bezel areas of the third display device DD3 and the fourth display device DD4. In an embodiment, for example, the width W1 of the bezel areas of the first display device DD1 and the second display device DD2 may be smaller than the width W2 of the bezel areas of the third display device DD3 and the fourth display device DD4.

As described with reference to FIG. 10A and FIG. 10B, the display panel 610 may be connected to the upper holder 620*a* and the lower holder 620*b* through the connection member having elasticity or stretchability, and thus the auxiliary display device according to an embodiment may be coupled to display devices having bezel areas having various widths.

In an embodiment, the auxiliary display device according to the embodiment may be coupled to the first display device DD1 and the second display device DD2 with a relatively narrow bezel area, and may also be coupled to the third display device DD3 and the fourth display device DD4 with a relatively wide bezel area by extending the connection member connected to the upper and lower ends of the display panel 610.

Figure 11:
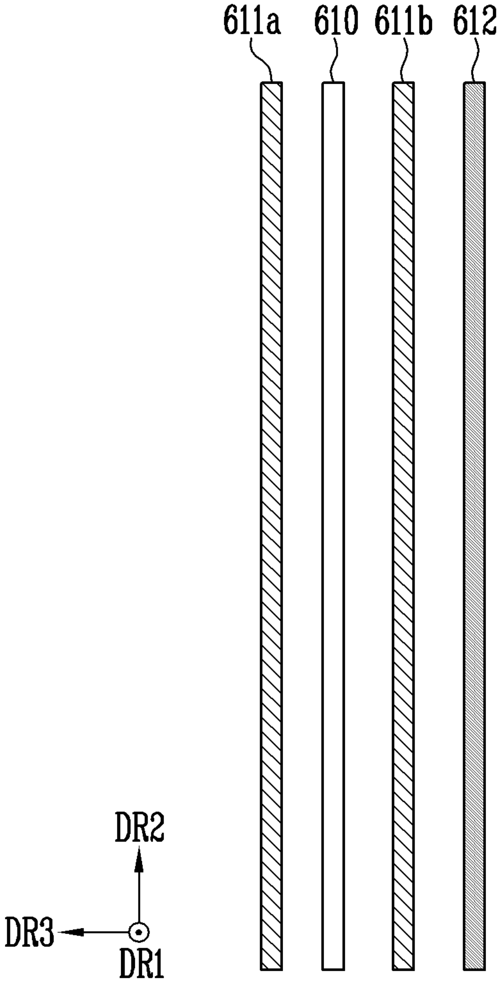
FIG. 11 is a drawing illustrating a display panel of an auxiliary display device according to an embodiment.

FIG. 11 is a drawing illustrating a display panel of an auxiliary display device according to an embodiment.

Referring to FIG. 11, the auxiliary display device according to an embodiment may further include a front protective glass 611*a* disposed on the front surface of the display panel 610 and a rear protective glass 611*b* disposed on the rear surface of the display panel 610. The display panel 610 according to an embodiment may be an OLED panel having a narrow bezel, and compared to other display panels (for example, a display panel included in the first display device DD1 or second display device DD2 in FIG. 7), the display panel 610 may be small in size in the horizontal direction or in the first direction DR1. In an embodiment where the auxiliary display device is detached or attached (or detachably attached) to other display devices, the durability of the display panel 610 included in the auxiliary display device may be important. The auxiliary display device according to an embodiment further includes the front protective glass 611*a* and the rear protective glass 611*b* on the front and rear surfaces of the display panel 610, so that the durability of the display panel 610 may be increased.

In an embodiment of the auxiliary display device, a heat dissipating plate 612 may be further disposed on the rear surface of the rear protective glass. The heat dissipating plate 612 is a component for dissipating heat generated from the panel, and may be, for example, a heat sink or a vapor chamber. The heat dissipating plate 612 may include a material such as a copper or aluminum alloy.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. An auxiliary display device, which is connected to first and second display devices, the auxiliary display device comprising:

a display panel;

an upper holder and a lower holder respectively connected to upper and lower portions of the display panel;

an upper fixing portion connected to the upper holder, wherein the upper fixing portion fixes an upper end of the auxiliary display device to an upper end of the first display device and an upper end of the second display device in a state where one edge of the first display device and one edge of the second display device are adjacent to each other; and a lower fixing portion connected to the lower holder, wherein the lower fixing portion fixes a lower end of the auxiliary display device to a lower end of the first display device and a lower end of the second display device in the state where the one edge of the first display device and the one edge of the second display device are adjacent to each other, wherein when the first and second display devices are connected to each other by the upper fixing portion and the lower fixing portion, the display panel covers a bezel area of the first display device corresponding to the one edge thereof and a bezel area of the second display device corresponding to the one edge thereof, wherein the upper fixing portion includes:

a first support member extending from a rear surface of the upper holder in a first direction perpendicular to the rear surface of the upper holder;

a first rotation shaft extending from a lower surface of the first support member in a second direction perpendicular to the first direction;

a first arm with one end connected to the first rotation shaft, wherein the first arm rotates about the first rotation shaft; and a second arm with one end connected to the first rotation shaft, wherein the second arm rotates about the first rotation shaft in an opposite direction to the first arm.

2. The auxiliary display device of claim 1, wherein the first arm and the second arm are connected to the first rotation shaft through a first elastic member, and wherein the first elastic member provides an elastic force to an opposing end of the first arm and an opposing end of the second arm in a direction opposite to the first direction.

3. The auxiliary display device of claim 2, wherein a distance between the first rotation shaft and the upper holder is greater than a thickness of the first display device and a thickness of the second display device.

4. The auxiliary display device of claim 2, wherein the lower fixing portion includes:

a second support member extending from a rear surface of the lower holder in the first direction perpendicular to the rear surface of the lower holder;

a second rotation shaft extending from an upper surface of the second support member in a third direction which is opposite to the second direction;

a third arm with one end connected to the second rotation shaft, wherein the third arm rotates about the second rotation shaft; and a fourth arm with one end connected to the second rotation shaft, wherein the fourth arm rotates about the second rotation shaft, the third arm and the fourth arm are connected to the second rotation shaft through a second elastic member, and the second elastic member provides an elastic force to an opposing end of the third arm and an opposing end of the fourth arm in the direction opposite to the first direction.

5. The auxiliary display device of claim 4, wherein a distance between the second rotation shaft and the lower holder is greater than a thickness of the first display device and a thickness of the second display device.

6. The auxiliary display device of claim 4, wherein each of the first arm, the second arm, the third arm, and the fourth arm includes a rubber pad protruding from the opposing end thereof in the opposite direction to the first direction.

7. The auxiliary display device of claim 1, further comprising a driver including a driving circuit connected to the display panel, wherein the driver provides a driving signal to the display panel; and a power supply portion which supplies power to the display panel.

8. The auxiliary display device of claim 7, further comprising a touch sensor disposed on a front surface of the display panel, wherein the driver further includes a touch driving circuit which is connected to the touch sensor and senses a touch input from an outside through the touch sensor.

9. The auxiliary display device of claim 1, wherein a width of a bezel of the auxiliary display device is narrower than a width of a bezel of each of the first display device and the second display device.

10. The auxiliary display device of claim 1, further comprising a front protective glass disposed on a front surface of the display panel; and a rear protective glass disposed on a rear surface of the display panel.

11. The auxiliary display device of claim 10, further comprising a heat dissipating plate disposed on a rear surface of the rear protective glass.

12. An auxiliary display device, which is connected to first and second display devices, the auxiliary display device comprising:

a display panel;

an upper holder and a lower holder respectively connected to upper and lower portions of the display panel;

an upper fixing portion connected to the upper holder, wherein the upper fixing portion fixes an upper end of the auxiliary display device to an upper end of the first display device and an upper end of the second display device in a state where one edge of the first display device and one edge of the second display device are adjacent to each other; and a lower fixing portion connected to the lower holder, wherein the lower fixing portion fixes a lower end of the auxiliary display device to a lower end of the first display device and a lower end of the second display device in the state where the one edge of the first display device and the one edge of the second display device are adjacent to each other, wherein when the first and second display devices are connected to each other by the upper fixing portion and the lower fixing portion, the display panel covers a bezel area of the first display device corresponding to the one edge thereof and a bezel area of the second display device corresponding to the one edge thereof, wherein the upper holder further includes a groove defined in a lower portion thereof and a first clamp disposed on an inner surface of the upper holder, wherein the first clamp is connected to an upper end portion of the display panel inserted into the upper holder through the groove of the upper holder to fix the upper end portion of the display panel to the upper holder, wherein the lower holder further includes a groove defined in an upper portion thereof and a second clamp disposed on an inner surface of the lower holder, and wherein the second clamp is connected to a lower end portion of the display panel inserted into the lower holder through the groove of the lower holder to fix the lower end portion of the display panel to the lower holder.

13. The auxiliary display device of claim 12, wherein the display panel is a flexible display panel, and the display panel is coupled to the upper holder and the lower holder in a bent shape.

14. The auxiliary display device of claim 13, wherein the first clamp and the second clamp include a flexible material, and the first clamp and the second clamp are bent in a same shape as the display panel.

15. The auxiliary display device of claim 14, wherein the upper holder further includes a first connection member with one end connected to the first clamp and an opposing end connected to the upper end portion of the display panel, the lower holder further includes a second connection member with one end connected to the second clamp and an opposing end connected to the lower end portion of the display panel, and the first connection member and the second connection member include an elastic material or a stretchable material.

* * * * *